United States Patent
MacAulay

(10) Patent No.: US 6,388,809 B1
(45) Date of Patent: May 14, 2002

(54) METHODS AND APPARATUS FOR IMPROVED DEPTH RESOLUTION USE OF OUT-OF-FOCUS INFORMATION IN MICROSCOPY

(75) Inventor: Calum E. MacAulay, Vancouver (CA)

(73) Assignee: Digital Optical Imaging Corporation, Bellingham, WA (US)

( * ) Notice: Subject to any disclaimer, the term of this patent is extended or adjusted under 35 U.S.C. 154(b) by 0 days.

(21) Appl. No.: 09/559,239

(22) Filed: Apr. 26, 2000

Related U.S. Application Data

(63) Continuation-in-part of application No. 09/179,185, filed on Oct. 29, 1998.
(60) Provisional application No. 60/131,988, filed on Apr. 30, 1999, and provisional application No. 60/063,893, filed on Oct. 29, 1997.

(51) Int. Cl.[7] .......................... G02B 21/00; G02B 21/26
(52) U.S. Cl. .................. 359/383; 359/379; 359/392
(58) Field of Search ................. 359/368, 383, 359/379, 392; 250/201.3, 201.8

(56) References Cited

U.S. PATENT DOCUMENTS

| | | | |
|---|---|---|---|
| 4,906,097 A | * 3/1990 | Wiedemann ................. 356/375 |
| 5,065,008 A | 11/1991 | Hakamata et al. .......... 250/216 |
| 5,179,276 A | 1/1993 | Hakamata .................. 250/234 |
| 5,218,195 A | 6/1993 | Hakamata .................. 250/216 |
| 5,239,178 A | 8/1993 | Derndinger et al. ........ 250/234 |
| 5,299,053 A | 3/1994 | Kleinburg et al. .......... 359/227 |
| 5,459,323 A | 10/1995 | Morgan .................... 250/458.1 |
| 5,587,832 A | 12/1996 | Krause ...................... 359/385 |
| 5,706,085 A | 1/1998 | Blossey et al. ............. 356/357 |
| 5,742,419 A | 4/1998 | Dickensheets et al. ...... 359/201 |
| 5,760,901 A | 6/1998 | Hill ............................. 356/345 |
| 5,783,814 A | * 7/1998 | Fairley et al. ............ 250/201.3 |
| 5,812,269 A | 9/1998 | Svetkoff et al. ............. 356/376 |
| 5,822,055 A | 10/1998 | Tsai et al. .................... 356/237 |
| 5,866,430 A | 2/1999 | Grow .......................... 436/172 |
| 5,867,251 A | 2/1999 | Webb .......................... 351/221 |
| 5,887,009 A | 3/1999 | Mandella et al. .............. 372/6 |
| 5,900,949 A | 5/1999 | Sampas ....................... 358/482 |

FOREIGN PATENT DOCUMENTS

| | | | |
|---|---|---|---|
| DE | 3108389 A | 4/1982 | ............ G02B/9/00 |
| EP | 0 482 340 A1 | 4/1992 | ............ A61B/3/13 |
| EP | 0 833 181 A1 | 4/1998 | ........... G02B/21/00 |
| EP | 0 911 667 A1 | 4/1999 | ........... G02B/21/00 |
| EP | 0 916 981 A1 | 5/1999 | ........... G02B/21/00 |
| JP | 3132612 A | 6/1991 | ........... G02B/21/00 |
| JP | 3134608 A | 6/1991 | ........... G02B/21/06 |
| WO | WO 98/28655 | 7/1998 | ............ G01B/9/00 |

OTHER PUBLICATIONS

Barth, M., et al., "Boosting the optical transfer function with a spatially resolving detector in a high numerical aperture confocal reflection microscope", *Optik*, 96:2. pp. 53–58 (1994).

(List continued on next page.)

*Primary Examiner*—Cassandra Spyrou
*Assistant Examiner*—Jared Treas
(74) *Attorney, Agent, or Firm*—Graybeal Jackson Haley LLP

(57) ABSTRACT

Apparatus and methods that improve the depth resolution of confocal microscopy images using out-of-focus information from within the focal plane of interest (from the x-y direction) and/or from planes above and below the focal plane of interest (from the z-direction). The interaction of (a) a reflective surface or other light-emanating material and (b) the PSF formed by a confocal microscope results in "out-of-focus" information in, above and below the focal plane; this "out-of-focus" information can be measured. Comparing the measurements in the x-y plane, preferably at a plurality of z-positions, can improve the resolution along each of the x, y, and z-axes, increase the number of the photons used in the system, thus improving the signal to noise ratio, and help correct for aberrations, such as spherical aberrations or other optical aberrations, in the optical system of a microscope.

23 Claims, 5 Drawing Sheets

OTHER PUBLICATIONS

Bertero, M., et al., "Super–resolution in confocal scanning microscopy", *Inverse Problems 3*, pp. 195–212 (1987).

Bertero, M., et al., "Resolution in diffraction–limited imaging, a singular value analysis", *Optica Acta*, 31:8, pp. 923–946 (1984).

Cox, I.J., et al., "Improvement in resolution by nearly confocal microscopy", *Applied Optics*, 21:5, pp. 778–781 (1982).

Reinholz, F., et al., "Image enhancement by tracking and sampling in the detection plane", *Optik*, 96:2, pp. 59–64 (1994).

Reinholz, F., et al., "A new powerful mode of laser scanning microscopy", *Optik*, 82:4, pp. 165–168 (1989).

Sheppard, C.J.R., et al., "Improvement in axial resolution by interference confocal microscopy", *Optik*, 87:3, pp. 129–132 (1991).

Wilson, T., et al., "Effect of detector displacement in confocal imaging systems", *Applied Optics*, 27:18; pp. 3791–3799 (1988).

* cited by examiner

METHODS AND APPARATUS FOR IMPROVED DEPTH RESOLUTION USE OF OUT-OF-FOCUS INFORMATION IN MICROSCOPY

CROSS-REFERENCE TO RELATED APPLICATIONS

The present application claims priority from U.S. provisional patent application No. 60/131,988, filed Apr. 30, 1999, and is also a continuation-in-part application of U.S. patent application Ser. No. 09/179,185, filed Oct. 29, 1998, both of which are presently pending, and which application Ser. No. 09/179,185 in turn claims priority from U.S. provisional patent application No. 60/063,893, filed Oct. 30, 1997.

FIELD OF THE INVENTION

The field of the present invention is confocal microscopy.

BACKGROUND OF THE INVENTION

Microscopy is used to produce magnified representations of both dynamic and stationary objects or samples; microscopes magnify small things and make them easier to see. There are many different modes of microscopy such as brightfield microscopy, darkfield microscopy, phase contrast microscopy, fluorescence microscopy, reflectance or reflected light microscopy and confocal microscopy. All of these forms of microscopy deliver illumination light in a controlled fashion to the sample and collect as much of the light containing the desired information about the sample as possible. Typically, this is accomplished using Kohler illumination in any of reflectance microscopy, transmission microscopy or epifluorescence microscopy. These methods use appropriately placed diaphragms and lenses to control both the size of the numerical aperture (illumination cone) and the size of the illuminated area of the sample. In Kohler illumination, diaphragms are placed in at least two locations. First, a diaphragm is placed in the conjugate image plane of the sample, a location which permits control of the size of the illuminated area of the sample. Second, a diaphragm is placed in the conjugate image plane of the aperture diaphragm of the objective lens(es) (this location is also a conjugate image plane of the aperture diaphragm of the condenser lens(es)), a location which permits control of the angle(s) of the light illuminating the sample. Typically, any of the diaphragms can be a simple iris (for example, for brightfield microscopy and epillumination fluorescence microscopy), but the diaphragms can also be more complex (for example, in darkfield microscopy, where the diaphragms may comprise cutout rings of different diameters).

An example of a microscope using Kohler illumination is set forth in FIG. 1. In the figure, microscope 2 comprises a light source 4 that emits a plurality of light rays, which have been divided into first light rays 6, second light rays 8 and third light rays 10. The light rays are transmitted along an illumination light path from light source 4 through light source lens 12, adjustable iris field diaphragm 14 and condensor lenses 16. An adjustable iris aperture diaphragm (condenser) 18 can be disposed between upstream and downstream condenser lenses 16. The light then contacts, or impinges upon, sample 20 and then proceeds to pass through objective lenses 22, which objective lenses can comprise an aperture diaphragm (objective) 24 spaced between the objective lenses 22, and then the light rays proceed to a light detector 26. As noted above, the angle of illumination of the sample can be controlled by modulating the light as it passes through conjugate image planes of the aperture diaphragm of the objective lens, which planes can be found, for example, at light source 4 and the upstream aperture diaphragm 18 in FIG. 1, while the location and/or area of illumination of the sample can be controlled by modulating light as it passes through a conjugate image plane of the sample, which plane corresponds to the adjustable iris field diaphragm 14 in FIG. 1.

One preferred form of microscopy is confocal microscopy, in which one or more discreet aperture spots are illuminated in the object plane of the microscope from which transmitted, reflected or fluorescent light is then relayed for observation through conjugate apertures in the image plane. In some embodiments, confocal microscopy can result in spatial resolution about 1.3 times better than the optimum resolution obtainable by conventional light microscopy. See, e.g., U.S. Pat. No. 5,587,832. Additionally, confocal microscopy can reduce the interference of stray, out-of-focus light from an observed specimen above or below the focal plane, and can permit optical sectioning of tissue as well as high-resolution 3-D reconstruction of the tissue. The technique can effectively resolve individual cells and living tissue without staining. Confocal microscopy can be performed using mechanical translation of the specimen with fixed optics, using a fixed specimen and scanning beams manipulated by special rotating aperture disks, or a spatial light modulator (SLM). See U.S. patent application Ser. No. 09/179,185, entitled Apparatus And Methods Relating To Spatially Light Modulated Microscopy; U.S. Pat. Nos. 5,867,251; 4,802,748, 5,067,805, 5,099,363, 5,162, 941. The special rotating aperture disks, often called Nipkow disks, typically comprise a plurality of apertures, but only one aperture at a time is used for confocal scanning. Still other known confocal scanning systems have used a laser beam rastered with rotating mirrors to scan a specimen or a laser beam that scans a slit rather than a spot; such slit scanning increases imaging speed relative to rotating aperture disks but slightly degrades resolution. See U.S. Pat. No. 5,587,832. The use of spatial light modulators permits control of either or both of the angle(s) of the light and location of the light, and can provide high speed confocal scanning without the loss of resolution that accompanies slit scanning instead of spot scanning. See U.S. patent application Ser. No. 09/179,185, entitled Apparatus And Methods Relating To Spatially Light Modulated Microscopy; U.S. Pat. No. 5,867,251.

Confocal microscopy, however, does not utilize a significant portion of the light emanating from the spot on the sample that is under investigation, and thus has unnecessarily limited resolution in both the x-y plane (sideways) and in the z-direction (up and down, or depth), and an unnecessarily limited signal to noise ratio. Thus, there has gone unmet a need for improved methods of confocal microscopy that provide enhanced resolution and/or enhanced signal to noise ratio. The present invention provides these and other advantages.

SUMMARY OF THE INVENTION

The present invention provides apparatus and methods that improve the depth resolution of confocal microscopy images. The present invention can be applied to all of reflectance microscopy, transmission microscopy and fluorescence microscopy. The present invention comprises utilizing out-of-focus information from within the focal plane of interest (from the x-y direction) and/or from planes above and below the focal plane of interest (from the z-direction). In general, the present invention takes advantage of the observation that in confocal microscopy the intensity of the light emanating from the illumination spot of the sample falls off or decreases in a regular fashion as the distance from the illumination spot increases. For example, the point spread function (PSF) of the emanating light for a confocal, cylindrically symmetric lens system falls off approximately as $sinc^2(z)$ for the singularly illuminated spot, or central illumination pixel, in the vicinity of the focal plane. This PSF in the x-y plane is a function of depth (i.e., of the z-position). The interaction of (a) a reflective surface or other light-emanating surface, such as a fluorescent surface or transmissive surface, and (b) the PSF formed by a confocal microscope, results in "out-of-focus" information in, above and below the focal plane; this "out-of-focus" information can be measured. By comparing the measurements in the x-y plane, preferably at a plurality of z-positions, one can improve the resolution along each of the x, y, and z-axes. An additional advantage to using the out-of-focus information is that it increases the number of the photons used in the system, thus improving the signal to noise ratio. In addition, incorporation of such information can also improve depth resolution and otherwise help correct for aberrations, such as spherical aberrations or other optical aberrations, in the optical system of a microscope.

Thus, in one aspect the present invention provides confocal microscopes comprising a light detection and analysis system, the system comprising a light detector disposed downstream from a sample in a conjugate image plane of the sample. The detector comprises a central detection pixel positioned to detect and measure in-focus light emanating from a discrete illumination pixel of the sample to provide in-focus data and at least one adjacent detection pixel in an x-y plane relative to the sample that is positioned to independently detect and measure out-of-focus light emanating from the discrete illumination pixel of the sample in the x-y plane. This provides out-of-focus data in the x-y plane. The system further comprises a controller operably connected to the detector and containing computer implemented programming that compiles and combines or convolves the in-focus data and the out-of-focus data to enhance resolution of the discrete illumination pixel of the sample when compared to a resolution obtained without using the out-of-focus data. Generally, the resolution is enhanced in the z-direction by at least about 5% or 10%, preferably by at least 25–100%, and in the x-y plane by at least about 10% and further preferably by at least about 15–40%.

In additional embodiments for this and other aspects of the present invention (unless expressly stated otherwise or clear from the context, all embodiments of the present invention can be mixed and matched), the detector comprises a plurality of adjacent detection pixels that surround the central detection pixel and that independently detect and measure out-of-focus light emanating from the discrete illumination pixel of the sample, and the central detection pixel and the at least one adjacent detection pixel can abut each other. The controller may fit the out-of-focus data in the x-y plane according to a 2D Gaussian distribution or according to other suitable fitting functions. The detector can be movably connected to the sample along a z-axis of the sample such that movement of the detector relative to the sample permits the detector to detect and measure in-focus data from a focal plane of the sample along the z-axis and out-of-focus data from above or below the focal plane along the z-axis and from the x-y direction within each of such planes. The controller can further contain computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis.

In preferred embodiments, the microscope further comprises a spatial light modulator disposed upstream of the sample in a conjugate image plane of the sample and computer implemented programming that causes the spatial light modulator to simultaneously form a plurality of the illumination spots that illuminate a plurality of discrete illumination pixels of the sample and to provide sequential complementary patterns of the spots. The spatial light modulator can be disposed upstream of the sample in a conjugate image plane of the sample and can be operated to selectively alternate between brightfield microscopy and confocal microscopy.

In preferred embodiments, the microscope further comprises a reference mirror disposed in a conjugate image plane of the sample, the reference mirror movably connected to the detector along a z-axis of the mirror such that movement of the reference mirror relative to the detector permits the detector to detect and measure in-focus data from a focal plane of the reference mirror along the z-axis and out-of-focus data from above and below the focal plane along the z-axis, and wherein the controller contains computer implemented programming that compiles the in-focus data from along the z-axis of the reference mirror and the out-of-focus data from along the z-axis of the reference mirror to provide a reference stack of reference mirror images, and combines and convolves or compiles or otherwise compares the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

In another aspect, the invention provides a light detection and analysis system, the system comprising a light detector disposed downstream from a sample in a conjugate image plane of the sample, wherein the detector is movably connected to the sample along a z-axis of the sample such that movement of the detector relative to the sample permits the detector to detect and measure in-focus data from a focal plane of the sample along the z-axis and out-of-focus data from above and below the focal plane along the z-axis, the system further comprising a controller operably connected to the detector and containing computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis. Preferably, the detector further comprises a central detection pixel and at least one adjacent detection pixel, and the controller contains computer implemented programming that compiles and combines the in-focus data and the out-of-focus data to enhance resolution of the discrete illumination pixel of the sample when compared to a resolution obtained without using the out-of-focus data.

The microscope can be a reflectance microscope, transmission microscope, fluorescence microscope or other confocal microscope.

In a further aspect, the present invention provides a controller suitable for operable connection to a confocal microscope, wherein the controller comprises a digital light detector disposed downstream from a sample in a conjugate image plane of the sample, the detector comprising a central detection pixel positioned to detect and measure in-focus light emanating from a discrete illumination pixel of the sample to provide in-focus data and at least one adjacent detection pixel in an x-y plane relative to the sample and positioned to independently detect and measure out-of-focus light emanating from the discrete illumination pixel of the sample in the x-y plane to provide out-of-focus data in the x-y plane. Preferably, the controller further contains computer implemented programming that compiles and combines the in-focus data and the out-of-focus data to enhance resolution of the discrete illumination pixel of the sample when compared to a resolution obtained without using the out-of-focus data.

In certain embodiments, the controller fits the out-of-focus data in the x-y plane according to a 2D Gaussian distribution. The detector of the microscope under the control of such controller can be movably connected to the sample along a z-axis of the sample such that movement of the detector relative to the sample permits the detector to detect and measure in-focus data from a focal plane of the sample along the z-axis and out-of-focus data from above and below the focal plane along the z-axis. In such a situation, the controller preferably further contains computer implemented programming that compiles and combines or otherwise compares the in-focus data from along the z-axis and the out-of-focus data from along the z-axis to enhance resolution of the discrete illumination pixel of the sample when compared to a resolution obtained without using the out-of-focus data from along the z-axis.

The controller may also, if desired, fit information where the detector is movably connected along a z-axis to a reference mirror disposed in a conjugate image plane of the sample such that movement of the reference mirror relative to the detector permits the detector to detect and measure in-focus data from a focal plane of the reference mirror along the z-axis and out-of-focus data from above and below the focal plane along the z-axis, wherein the controller further contains computer implemented programming that compiles the in-focus data from along the z-axis of the reference mirror and the out-of-focus data from along the z-axis of the reference mirror to provide a reference stack of reference mirror images, and convolves or otherwise compares the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

In an additional further aspect, the present invention provides a confocal microscope comprising means for detecting and measuring out-of-focus light emanating from a discrete illumination pixel of a sample in at least one of an x-y plane and a z-axis to provide a measurement of out-of-focus light, and means for combining the measurement of the out-of-focus light with a measurement of in-focus light emanating from the discrete illumination pixel of the sample, to provide an enhanced resolution of the discrete illumination pixel of the sample when compared to a resolution obtained without using the out-of-focus data. The means for detecting can detect and measure out-of-focus light from both the x-y plane and the z-axis, and the means for combining can combine the measurement of light from both the x-y plane and the z-axis. The microscope can additionally comprise means for providing a reference stack of reference images along the z-axis, and means for convolving the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

In yet a further aspect, the present invention provides methods of enhancing resolution of a discrete illumination pixel of a sample using confocal microscopy, comprising detecting and measuring in-focus light emanating from the discrete illumination pixel to provide in-focus data, detecting and measuring out-of-focus light emanating from the discrete illumination pixel in an x-y plane of the sample to provide out-of-focus data in the x-y plane, and compiling and combining the in-focus data and the out-of-focus data to enhance resolution of the discrete illumination pixel of the sample when compared to a resolution obtained without using the out-of-focus data. As above, the out-of-focus data in the x-y plane can be fitted according to a 2D Gaussian distribution or according to other suitable fitting methods.

In preferred embodiments, the method further comprises detecting and measuring in-focus data from a focal plane of the sample along the z-axis of the sample and out-of-focus data from above or below the focal plane along the z-axis. Additionally, the detecting and measuring of out-of-focus data can be from both above and below the focal plane along the z-axis. The methods can also further comprise compiling and combining the in-focus data from along the z-axis and the out-of-focus data from along the z-axis to enhance resolution of the discrete illumination pixel of the sample when compared to a resolution obtained without using the out-of-focus data from along the z-axis, and simultaneously forming a plurality of the illumination spots on the sample to provide a plurality of discrete illumination pixels of the sample, and simultaneously detecting and measuring the light emanating from the plurality of discrete illumination pixels and compiling and combining the in-focus and out-of-focus data from the illumination spots.

In other preferred embodiments, the methods further comprise providing sequential complementary patterns of the illumination spots until the entire surface of the sample has been illuminated. The methods can additionally comprise selectively alternating between brightfield microscopy and confocal microscopy. In some embodiments, the methods can also comprise detecting and measuring in-focus light reflecting from a discrete illumination pixel of a reference mirror disposed in a conjugate image plane of the sample, the in-focus light being from a focal plane of the reference mirror along the z-axis, detecting and measuring out-of-focus light reflecting from the discrete illumination pixel of the reference mirror, the out-of-focus light being from above and below the focal plane along the z-axis, compiling the in-focus data from along the z-axis of the reference mirror and the out-of-focus data from along the z-axis of the reference mirror to provide a reference stack of reference mirror images, convolving the reference stack with the measurements of in-focus data and out-of-focus data from the z-axis of the sample, and determining the location of the focal plane of the sample and thus enhancing resolution of the discrete illumination pixel of the sample when compared to a resolution obtained without using the out-of-focus data from along the z-axis.

In yet another further aspect, the present invention provides methods of enhancing resolution of a discrete illumination pixel of a sample during microscopy comprising detecting and measuring in-focus data from a focal plane of the sample along the z-axis of the sample, detecting and measuring out-of-focus data from above and below the focal plane along the z-axis of the sample, and compiling and combining the in-focus data from along the z-axis and the out-of-focus data from along the z-axis to enhance resolution of the discrete illumination pixel of the sample when compared to a resolution obtained without using the out-of-focus data from along the z-axis.

In some embodiments, the methods can further comprise detecting and measuring out-of-focus light emanating from the discrete illumination pixel in an x-y plane of the sample to provide out-of-focus data in the x-y plane, and compiling and combining the in-focus data and the out-of-focus data in the x-y plane to enhance resolution of the discrete illumination pixel of the sample when compared to a resolution obtained without using the out-of-focus data in the x-y plane, preferably using a 2D Gaussian distribution and simultaneously forming a plurality of the illumination spots on the sample to provide a plurality of discrete illumination pixels of the sample, and simultaneously detecting and measuring the light emanating from the plurality of discrete illumination pixels and compiling and combining the in-focus and out-of-focus data from the illumination spots. Further preferably, the methods comprise providing sequential complementary patterns of the illumination spots until the entire surface of the sample has been illuminated and can include selectively alternating between brightfield microscopy and confocal microscopy.

In further embodiments, the methods can further comprise detecting and measuring in-focus light reflecting from a discrete illumination pixel of a reference mirror disposed in a conjugate image plane of the sample, the in-focus light being from a focal plane of the reference mirror along the z-axis, detecting and measuring out-of-focus light reflecting from the discrete illumination pixel of the reference mirror, the out-of-focus light being from above and below the focal plane along the z-axis, compiling the in-focus data from along the z-axis of the reference mirror and the out-of-focus data from along the z-axis of the reference mirror to provide a reference stack of reference mirror images, convolving the reference stack with the measurements of in-focus data and out-of-focus data from the z-axis of the sample, and determining the location of the focal plane of the sample and thus enhancing resolution of the discrete illumination pixel of the sample when compared to a resolution obtained without using the out-of-focus data from along the z-axis.

These and other aspects, features and embodiments of the present invention are set forth within this application, including the following Detailed Description and attached drawings. In addition, various references are set forth herein, including in the Cross-Reference To Related Applications, that describe in more detail certain apparatus, methods and other information; all such references are incorporated herein by reference in their entirety.

DETAILED DESCRIPTION OF THE INVENTION

Figure 1A:
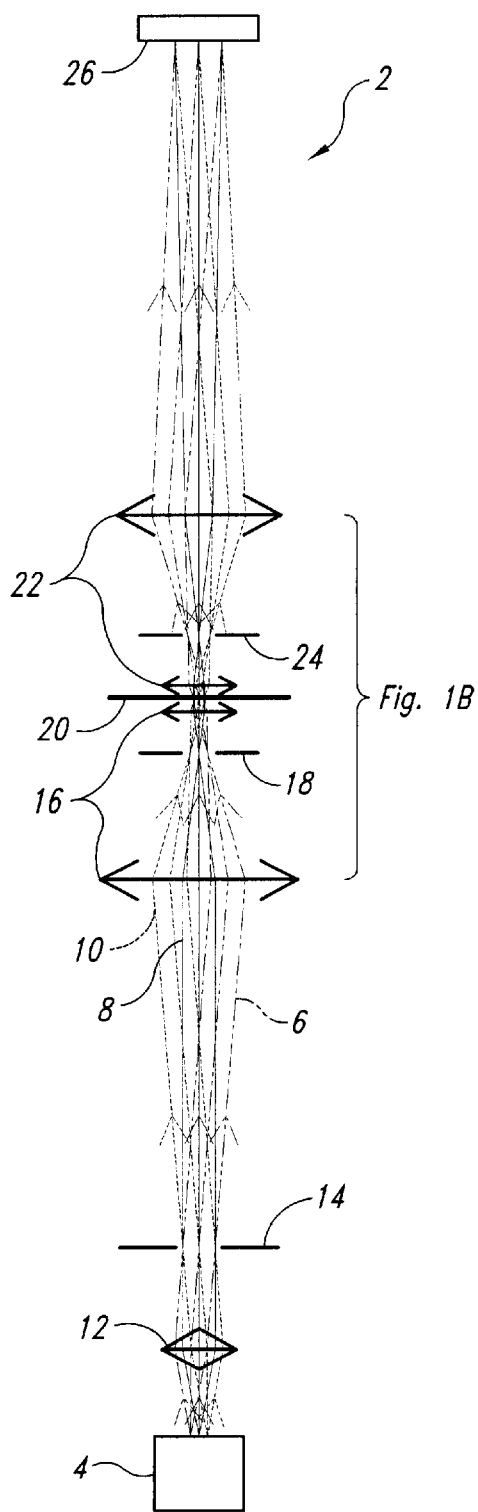
FIG. 1 provides a schematic view and an expanded schematic view of a conventional transmission light microscope using Kohler illumination.
Figure 1B:
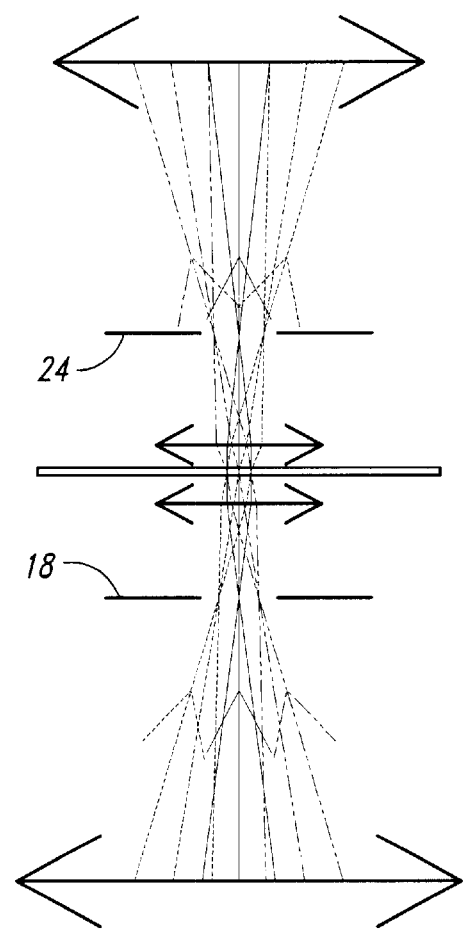

The present invention provides apparatus and methods that improve the depth resolution and signal to noise ratio of confocal microscopy images, including reflectance, transmission and fluorescence microscopy. The present invention utilizes out-of-focus information from the x-y direction of the focal plane as well as information from planes above and below the focal plane (from the z-direction). In confocal microscopy the intensity of the light emanating from the illumination spot of the sample falls off in a regular fashion as the distance from the illumination spot increases, both in the x-y plane and in the z-direction. The interaction of a light-emanating material in a sample and the PSF formed by a confocal microscope results in "out-of-focus" information in, above and below the focal plane. This "out-of-focus" information can be measured and used. By comparing the measurements in the x-y plane in one or more positions in the z-direction, the resolution can be improved or enhanced along both the z-direction and the x-y plane when compared to the resolution that is achieved without the use of the out-of-focus information. Generally, the resolution is enhanced in the z-direction by at least about 10% preferably by at least 25–100%, and in the x-y plane by at least about 10% and further preferably by at least about 15–40%. Also, by utilizing the out-of-focus information, a larger number of the photons in the system are used, thus improving the signal to noise ratio. In addition, incorporation of such information can also improve depth resolution and otherwise help correct for aberrations in the optical system of a microscope.

In accordance with the present invention, it is typically desirable to assume that the reflective surface or other sample surface is large with respect to the x-y resolution, that the reflectivity or other light emanation does not vary substantially relative to the spot size on the surface in the x and y directions, and that the surface to be imaged is approximately normal to the optical axis.

However, it is also possible, and indeed is one of the advantages of the present invention, to utilize out-of-focus information from a location that does vary substantially in light emanation in the x-y or z-directions, due to variations in darkness in the sample, a small surface size with respect to the x-y resolution, or other reasons. In one preferred embodiment, a brightfield image of the region of interest can be used to produce a reflectivity or light emanation map of the surface in question. This map is used to assign weights to x-y pixels, preferably all such pixels, to such that each respective x-y position contributes correctly to the convolution or other combination calculation. For example, brighter pixels from the reflectivity map can be assigned smaller weights, while darker pixels from the reflectivity map can be assigned higher weights. In another preferred embodiment, the surface is not normal to the optical axis. This restriction for normal surface is due to the fact that the reference stack of images gathered in the z-direction—for example the stack of images collected while illuminating the mirror—contains information about the 3-dimensional interaction of the PSF off a surface normal to the optical axis. However, additional reference stacks can be collected for various angles of incidence between the reference mirror and the light beam. These reference stacks are then used with the image stack obtained from the sample (again for various offsets along the z-axis). The reference stack and offset position for which the convolution calculation yields the highest result give a measure of the depth and surface slope of the target position.

Definitions

The following paragraphs provide definitions of some of the terms used herein. All terms used herein, including those specifically described below in this section, are used in accordance with their ordinary meanings unless the context or definition indicates otherwise. Also unless indicated otherwise, except within the claims, the use of "or" includes "and" and vice-versa. Non-limiting terms are not to be construed as limiting unless expressly stated (for example, "including" means "including without limitation" unless expressly stated otherwise).

A "discrete illumination pixel" or spot is an area, typically on or in a sample but potentially also on or in a reference mirror or other desired surface or material, that is illuminated by an illumination light in a confocal microscope wherein such spot is the only such spot illuminated by the confocal microscope or wherein such spot is sufficiently separated from other illumination pixels such that the discrete illumination pixel is capable of being detected by a central detection pixel without undue interference from the other illumination pixels. Preferably, the discrete illumination spot is capable of being detected by the central detection pixel and at least one detection pixel adjacent to the central detection pixel without undue interference from the other illumination pixels.

A "central detection pixel" is a spot in a pixelated detector, such as a charge coupled device (CCD), charge injection device (CID), or other detector capable of detecting or distinguishing individual detection locations within the detector corresponding to an illumination pixel within a sample. Typically, the spot comprises a single detection element or pixel in the detector, but it can also comprise a plurality of detection elements or pixels. Also typically, the light from the discrete illumination pixel of the sample is directly conveyed via an optical path to the central detection pixel, which light path may include one or more lenses, mirrors, beam splitters or other optical elements. The light from the illumination pixel of the sample can also be conveyed to the central detection pixel via electronic pathways or other pathways; preferably such transmission does not introduce any non-distinguishable artifacts into the data from the illumination pixel. The central detection pixel detects in-focus light from the illumination pixel. A detection pixel is adjacent to the central detection pixel when it is capable of receiving significant "stray" light from the illumination pixel; preferably a detection pixel abuts the central detection pixel or abuts a detection pixel that in turn abuts the central detection pixel. Thus, such "adjacent detection pixel" detects out-of-focus light from the illumination pixel. The adjacent detection pixel is able to independently detect and measure out-of-focus light emanating from the central illumination pixel when it can deliver different information about the out-of-focus light than the information that is delivered by the central detection pixel about the in-focus light. The pixels herein are often described as capable of detecting and measuring light or other information; the actual measuring or analysis of the light may take place in a processor or other device that is not physically located within the pixel.

"In-focus" indicates light, data derived from the light, or other signal or information, emanating from a discrete illumination pixel to a corresponding central detection pixel. "Out-of-focus" indicates light, data derived from the light, or other signal or information, emanating from a discrete illumination pixel that "strays" from the path to the corresponding central detection pixel and instead impinges on one or more adjacent detection pixels. The "out-of-focus" information can be either "out-of-focus" in the x-y plane of the sample (generally, sideways or laterally), or in the z-direction of the sample (generally, up and down, or vertical).

A "spatial light modulator" is a device that is able to selectively modulate light. In the present invention, spatial light modulators are disposed in the light path of a microscope. Typically, the spatial light modulator comprises an array of individual light transmission pixels, which are a plurality of spots that have transmissive characteristics such that they either transmit or pass the light along the light path or block the light and prevent it from continuing along the light path (for example, by absorbing the light or by reflecting it out of the light path). Such pixelated arrays are well known in the art, having also been referred to as a multiple pattern aperture array, and can be formed by an array of ferroelectric liquid crystal devices, by a digital micromirror device, or by electrostatic microshutters. See U.S. Pat. No. 5,587,832; R. Vuelleumier, Novel Electromechanical Microshutter Display Device, Proc. Eurodisplay '84, Display Research Conference September 1984. Digital micromirror devices can be obtained from Texas Instruments, Inc., Dallas, Tex., U.S.A.

The "illumination light path" is the light path from a light source to a sample, while a "detection light path" is the light path for light emanating from a sample to a detector. Light emanating from a sample includes light that reflects from a sample, is transmitted through a sample, or is created within the sample, for example, fluorescent light that is created within a sample pursuant to excitation with an appropriate wavelength of light (typically UV or blue light).

A "conjugate image plane of the sample" is a plane in either the illumination light path or the detection light path where an image of the sample is recreated. The light detector(s) is typically located in one such site in the detection light path. The conjugate image planes of the sample defines locations that can control the size and location of spots on the sample that are illuminated and/or detected (depending upon whether the conjugate plane is in the illumination light path or the detection light path). The image plane of the sample is the plane wherein the sample is located, although the image plane of the sample can be greater or smaller than the size of the actual sample if either a plurality of light paths are provided or if the illumination area is greater or smaller than the size of the sample.

A "controller" is a device that is capable of controlling a spatial light modulator, a detector, including pixels within a detector, or other elements of the apparatus and methods of the present invention. For example, the controller can control the transmissive characteristics of the pixels in a spatial light modulator, control the on/off status of pixels of a pixelated light detector (such as a charge coupled device (CCD) or charge injection device (CID)), and/or compile data obtained from the detector, including using such data to make or reconstruct images or as feedback to control an upstream spatial light modulator. Typically, a controller comprises one or more computers or other devices comprising a central processing unit (CPU) and contains computer-implemented programming that directs the controller, or from which the controller directs other devices, to perform certain functions or actions, such as those functions and actions described herein. Controllers, and appropriate computer-implemented programming associated with such controllers, are either well known in the art or well within the skill of a skilled artisan in view of the present disclosure, and thus selection or creation of a desirable controller or computer-implemented programming for a particular aspect of the present invention is within the scope of the art in view of the present disclosure.

"Upstream" and "downstream" are used in their traditional sense wherein upstream indicates that a given device is closer to a light source, while downstream indicates that a given object is farther away from a light source.

The terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

Other terms and phrases in this application are defined in accordance with the above definitions, and in other portions of this application.

Figure 7A:
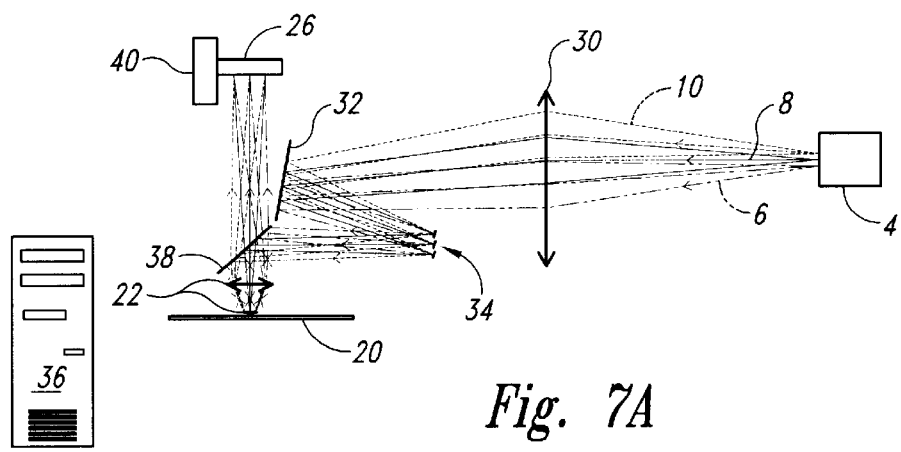
FIG. 7a depict schematically an embodiment of a system according to the present invention.
Figure 7B:
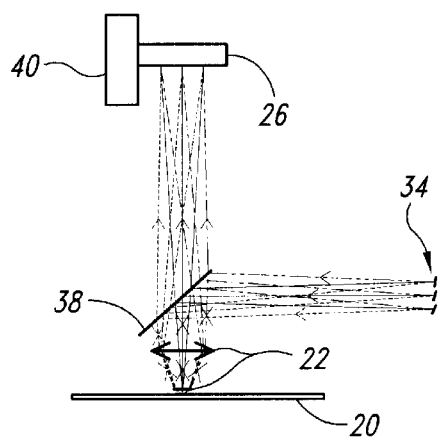
FIGS. 7b–7d depict schematically the sample and detector portion of FIG. 7a, showing the light detector at different levels along the z-axis.
Figure 7C:
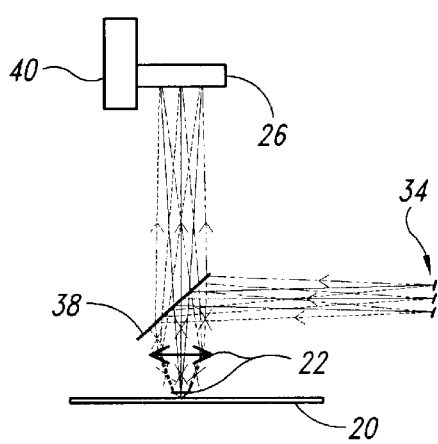
Figure 7D:
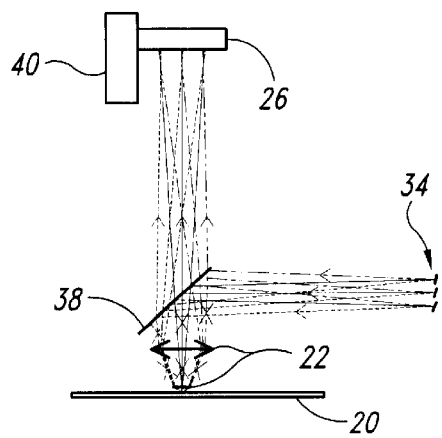

Turning to the Figures, FIGS. 7a–7d schematically depicts an exemplary embodiment of a system according to the present invention. In FIG. 7a, a light source 4 emits first light rays 6, second light rays 8, and third light rays 10. The light rays pass through a projection lens 30, reflect off simple mirror 32 then off a spatial light modulator (in the figure, a digital micro mirror device) 34. The light rays then progress to reflect off dichroic mirror 38, pass through objective lenses 22 and contact sample 20. The sample can be a specimen or a reference mirror. Light from sample 20 is then transmitted back through objective lenses 22, through dichroic mirror 38 and on to light detector 26 that has a central pixel with at least one adjacent pixel in an x-y plane. The detector is movably connected to the sample along the z axis via light detector translation stage 40. The system is connected, schematically in the Figure, to a controller 36 comprising computer-implemented programming and other resources to coordinate the functioning of the pieces of the system and to effect the methods associated therewith. FIGS. 7b–7d depict schematically the sample and detector portion of FIG. 7a, showing the light detector at different levels along the z-axis.

In one embodiment, the present invention can be implemented as follows. Illuminate the sample material of interest with a single point of light, or an array of well-spaced points of light (spaced such that the out-of-focus information from one spot does not overlap significantly with adjacent illuminated spots), in the x-y plane to provide a discrete illumination pixel, or a plurality of such pixels, respectively. Measure the reflected intensity of the illuminated spot(s) and surrounding nearby region(s) (in the x-y plane) from the sample for a plurality, and preferably every, sample position, where the sample is placed in a series of closely spaced positions along the z-axis (optical axis) of the microscope. This series of z-axis positions preferably encloses the range of the z positions of the surfaces to be detected. The resulting set of data provides a three-dimensional intensity map above, below, and around the in focus regions of the various surfaces to be detected and localized for each illuminated spot.

For each illumination spot and the surrounding nearby regions (i.e., for the in-focus and out-of-focus regions) for which the reflected light intensities have been collected, fit the (x-y, intensity) distributions, for example with a 2D Gaussian distribution, and record the parameters used to fit each illumination spot at each sample position along the z-axis. An example of a 2D Gaussian fitting function is as follows (equation 1):

$$F(x, y) = \frac{A}{2\pi\sigma_x\sigma_y} \exp\left\{-\frac{1}{2}\left[\left(\frac{x-\mu_x}{\sigma_x}\right)^2 + \left(\frac{y-\mu_y}{\sigma_y}\right)^2\right]\right\}$$

In equation 1, $\mu_x$, $\mu_y$ are the spatial locations in the x-y plane which maximize the fit of the equation to the observed intensities, $\sigma_x$, $\sigma_y$ are the widths in the x and the y directions that allow for the best fit of the measured intensities by a 2D Gaussian function and A is the scaling value which results in the best fit of the 2D Gaussian function to the data. Determining "best fit" for the given situation will be apparent to a person of ordinary skill in the art in view of the present application. Some examples of best fit include least squares and weighted least squares. Other fitting functions can also be used. For example, some preferred functions for the optical analysis of lens systems include $(\sin(x)/x)^2$ or a function based on a Bessel function of the first kind, $2J_1[x^*\sin(q)]/(x^*\sin(q))$. A suitable routine to fit Gaussian curves to image data is the Levenberg-Marquardt Method, from "Numerical Recipes in C", 2nd Edition, William H. Press et. al., Cambridge University Press, 1992, pp. 683–687.

For conventional confocal scanning systems the intensity of the pixel or integrated intensities of a disk of pixels centered on the (x-y) position of the illumination spot is designated as the measured confocal value at that location (x-y, z). For the methods herein the measured confocal value is preferably either $A/2\pi\sigma_x\sigma_y$ or $A/2\pi\sigma_x^2\pi_y^2$. Both of these values have the advantage of being calculated from all of the reflected light collected by the optical system of the microscope, and not just from just the in focus light as is done in a conventional confocal microscope. Thus, because more light (photons) is (are) used to estimate the confocal value, the error (Poisson noise) associated with the measured value is less.

For each spot measured/calculated in such a fashion (for example, pixel intensity, $A/2\pi\sigma_x\sigma_y$, or $A/2\pi\sigma_x^2\sigma_y$), the z-axis position that results in the most significant measured value represents the position at which the illuminated spot is in focus. The use of $A/2\pi\sigma_x\sigma_y$ or $A/2\pi\sigma_x^2\sigma_y^2$ as the measured value has the benefit of being much more dependent upon the sample position along the z-axis as seen in graph A and B. Or, stated another way, using $A/2\pi\sigma_x\sigma_y$ or $A/2\pi\sigma_x^2\sigma_y^2$ results in a confocal system with much less depth of field than an optically equivalent confocal microscope.

As is typically the case with the other embodiments in this application, this embodiment can be extended to other approaches to confocal microscopy. For example, it can be used for fluorescence confocal microscopy by measuring the system's response to the illumination of a point fluorescence source at a variety of in-focus and out-of-focus positions along and off the optical axis of the system, recording the illumination spot intensity as well as the intensities in the surrounding areas, finding the functions which fit the intensity responses at the various locations, and building a weighted sum of these functions. This weighted sum of functions can, if desired, then be fitted to actual measured data from a sample and based on the parameters assigned by the fitting function the value for the confocal location determined. By illuminating and fitting many locations, an image of the sample may be created with improved rejection of out-of-focus information. Similarly, confocal transmission microscopy can be effected by measuring the system's response to the illumination of a point light source at a variety of in-focus and out-of-focus positions along and off the optical axis of the system, and then proceeding as set forth above.

In an alternative embodiment, the present invention can be implemented by using a single illumination spot (or a plurality of discrete illumination spots) to illuminate a single x-y location on an optically flat plane mirror, and measure the signal generated at this location and in the surrounding region. Then, collect a stack of images like the stack of images collected in the methods described above and elsewhere herein, for various z-positions (preferably at regular or otherwise identifiable increments), both above and below the focal plane for the mirror. This image stack equates to a representation of the full 3-dimensional PSF as it interacts with the reflective surface of the mirror. Using the same x-y position, illuminate the object of interest. Again collect a stack of images, at the same increments of z position. Compare the mirror stack with the object stack for various offsets in the z-direction, preferably by convolving the stacks. The offset at which this comparison returns the highest result, or otherwise most significant result, is a measure of the location along the z-axis of the x-y position on the surface of the object.

Repeating each of these steps for each x-y position allows a complete topographical surface map to be generated for the object of interest.

Provided that the illumination spots are well separated, in other words are discrete illumination spots, the measurement process may take place in parallel. In a preferred embodiment for this and other embodiments within this application, the illumination and detection of the sample and mirror are controlled by a digital micromirror device (DMD) or other digital spatial light modulator, which DMD can rapidly switch the light back and forth between the mirror and the sample.

EXAMPLES

Example 1

1) An optically flat mirror was illuminated with an array of well-spaced points of light in the x-y plane to provide a plurality of discrete illumination pixels.

2) The reflected intensity of the illuminated pixels and surrounding nearby region(s) (in the x-y plane) from the sample was measured for corresponding sample positions, where the sample was placed in a series of closely spaced positions along the z-axis (optical axis) of the microscope.

3) This provided a three-dimensional intensity map above, below, and around the in-focus regions of the various surfaces to be detected, localized for each discrete illuminated pixel.

4) For each illumination spot and the surrounding nearby regions for which the reflected light intensities had been collected, the (x-y, intensity) distributions were fitted with a 2D Gaussian distribution and the parameters used to fit each discrete illumination pixel were recorded at each sample position along the z-axis. The following 2D Gaussian fitting function was used:

$$F(x, y) = \frac{A}{2\pi\sigma_x\sigma_y}\exp\left\{-\frac{1}{2}\left[\left(\frac{x-\mu_x}{\sigma_x}\right)^2 + \left(\frac{y-\mu_y}{\sigma_y}\right)^2\right]\right\}$$

In the equation, $\mu_x$, $\mu_y$ were the spatial locations in the x-y plane that maximized the fit of the equation to the observed intensities, $\sigma_x$, $\sigma_y$ were the widths in the x and the y directions which allow for the best fit of the measured intensities by a 2D Gaussian function and A is the scaling value which results in the best fit of the 2D Gaussian function to the data. The measured confocal value was also fitted using $A/2\pi\sigma_x^2\sigma_y^2$ in the equation.

Figure 2:
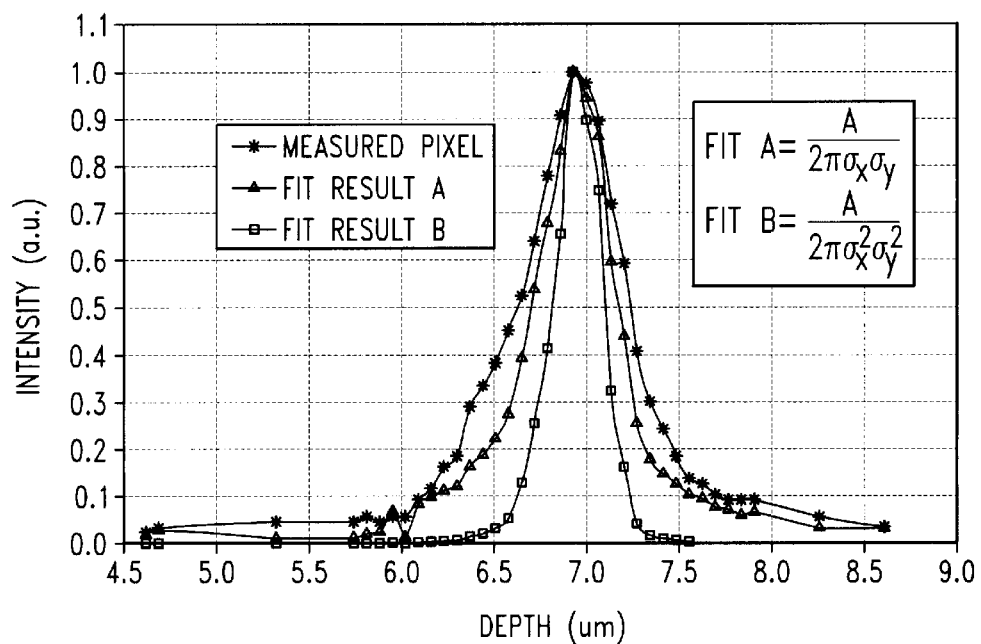
FIG. 2 provides a graph depicting the improvement in resolution achieved by using out-of-focus information.
Figure 3:
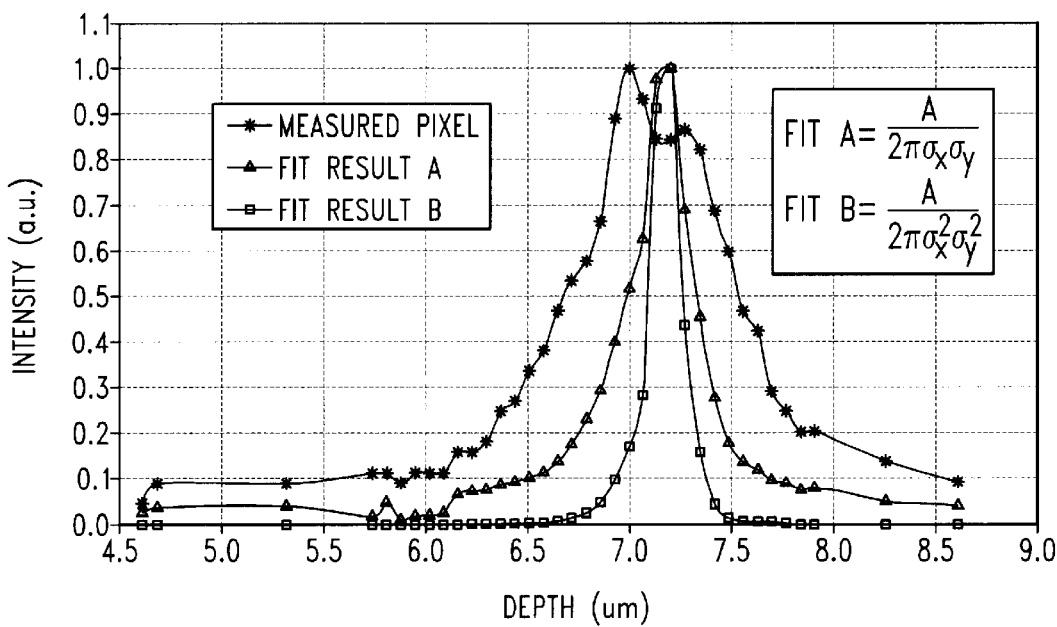
FIG. 3 provides a graph depicting the improvement in the rejection out-of-focus information as well as the increased signal to noise of the fitted data compared to the central pixel data.

5) For each spot measured/calculated in such a fashion (pixel intensity, $A/2\pi\sigma_x\sigma_y$, or $A/2\pi\sigma_x^2\sigma_y^2$), the z-axis position which resulted in the highest measured value represented the position at which the illuminated spot was in focus. FIG. 2 depicts the results obtained using $A/2\pi\sigma_x\sigma_y$, while FIG. 3 depicts the results obtained using $A/2\pi\sigma_x^2\sigma_y^2$.

Example 2

1) A plurality of discrete illumination pixels were used to illuminate a corresponding plurality of x-y locations on a tilted, optically flat plane mirror, and the signal generated at such locations and in the surrounding region were measured.

Figure 4:
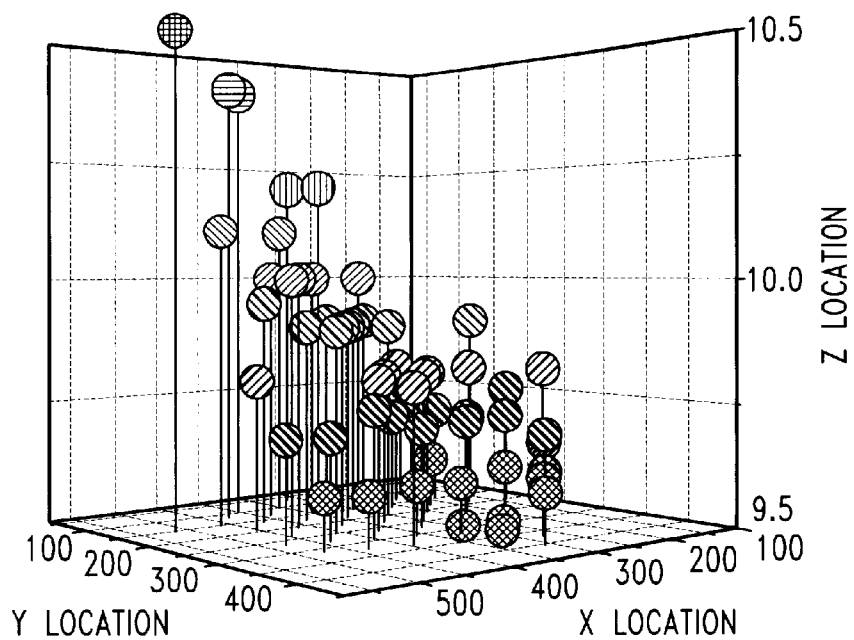
FIG. 4 provides a graph showing the measured locations of in-focus positions for a grid of spots measured across a tilted mirror using a conventional confocal method (i.e., without using out-of-focus information).
Figure 5:
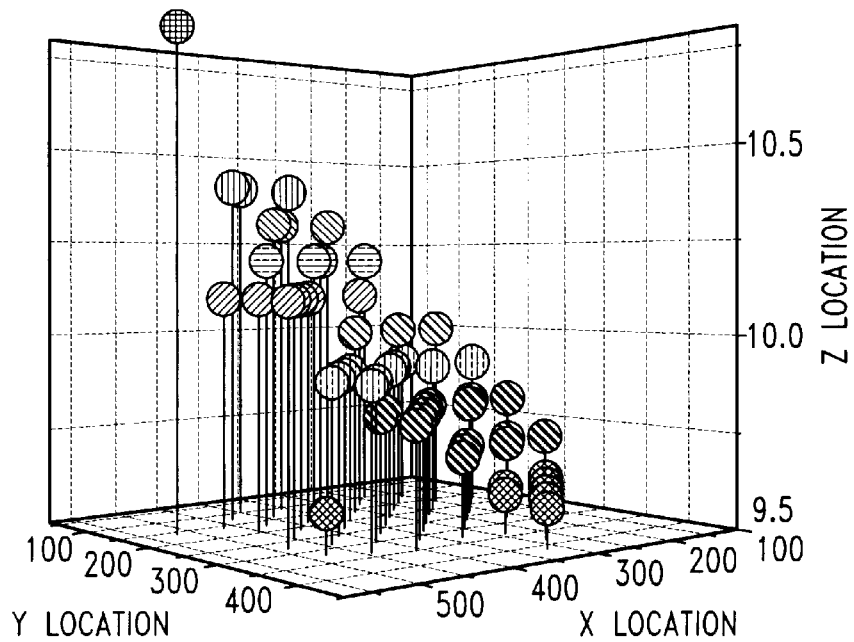
FIG. 5 provides a graph showing the measured locations of in-focus positions for a grid of spots measured using out-of-focus information.
Figure 6:
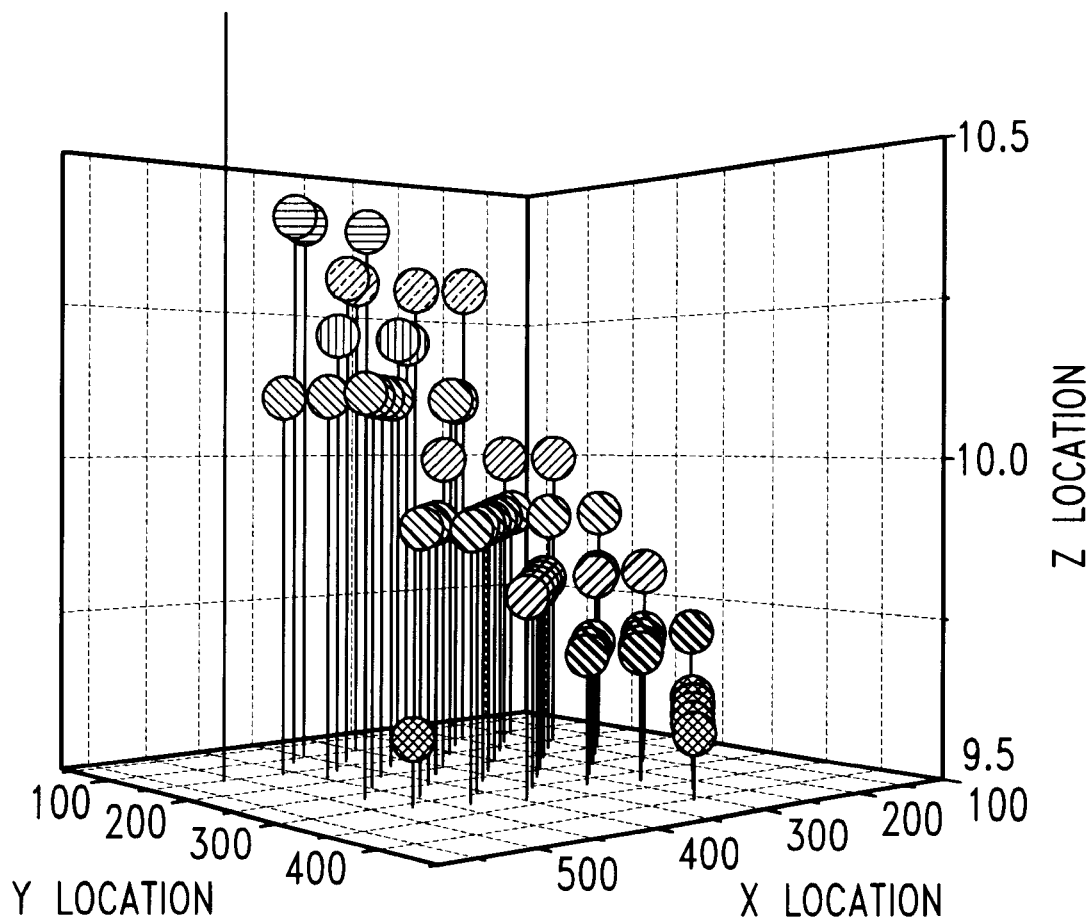
FIG. 6 provides a graph showing the measured locations of in-focus positions for a grid of pots measured using out-of-focus information.

2) A stack of images like the stack collected in Example 1 was collected, for various z-positions (at regular increments), both above and below the focal plane for the mirror. This mirror stack was a representation of the full 3-dimensional PSF as it interacted with the reflective surface of the mirror. FIG. 4 provides a graph showing the measured locations of in-focus positions for a grid of spots measured across the tilted mirror without using out-of-focus information. FIGS. 5 and 6 provide graphs showing the measured locations of in-focus positions for a grid of spots measured using out-of-focus information; FIGS. 5 and 6 were fitted using $a/2\pi\sigma_x\sigma_y$, or $a/2\pi\sigma_x^2\sigma_y^2$, respectively, similar to the manner followed in example 1 above. As can be seen, the fitted values (FIGS. 5 and 6) have much less scatter and fall much closer to a simple plane than do the single pixel values in FIG. 4 for in-focus positions found without the use of out-of-focus information.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A confocal microscope comprising a light detection and analysis system, the system comprising a light detector disposed downstream from a sample substantially in a conjugate image plane of the sample, wherein the detector comprises a central detection pixel positioned to detect and measure in-focus light emanating from a discrete illumination pixel of the sample to provide in-focus data and at least one adjacent detection pixel in an x-y plane relative to the sample and positioned to independently detect and measure out-of-focus light emanating from the discrete illumination pixel of the sample in the x-y plane to provide out-of-focus data in the x-y plane, the system further comprising a controller operably connected to the detector and containing computer implemented programming that compiles and combines the in-focus data and the out-of-focus data to enhance resolution of the discrete illumination pixel of the sample when compared to a resolution obtained without using the out-of-focus data, wherein the detector comprises a plurality of adjacent detection pixels that surround the central detection pixel and that independently detect and measure out-of-focus light emanating from the discrete illumination pixel of the sample, and wherein the detector is movably connected to the sample along a z-axis of the sample such that movement of the detector relative to the sample permits the detector to detect and measure in-focus data from a focal plane of the sample along the z-axis and out-of-focus data from above or below the focal plane along the z-axis.

2. The microscope of claim 1 wherein the central detection pixel and at least one of the adjacent detection pixels abut each other.

3. The microscope of claim 1 wherein the controller fits the out-of-focus data in the x-y plane according to a 2D Gaussian distribution.

4. The microscope of claim 1 wherein the detector detects and measures out-of-focus data from both above and below the focal plane along the z-axis.

5. The microscope of claim 1 wherein the controller further contains computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis.

6. The microscope of claim 1 wherein the microscope further comprises a spatial light modulator disposed upstream of the sample in a conjugate image plane of the sample and computer implemented programming that causes the spatial light modulator to simultaneously form a plurality of the illumination spots that illuminate a plurality of discrete illumination pixels of the sample and to provide sequential complementary patterns of the spots.

7. The microscope of claim 6 wherein the controller further comprises computer implemented programming that causes the spatial light modulator to selectively alternate between brightfield microscopy and confocal microscopy.

8. The microscope of claim 1 wherein the microscope further comprises a reference mirror disposed substantially in a conjugate image plane of the sample, the reference mirror movably connected to the detector along a z-axis of the mirror such that movement of the reference mirror relative to the detector permits the detector to detect and measure in-focus data from a focal plane of the reference mirror along the z-axis and out-of-focus data from above and below the focal plane along the z-axis, and wherein the controller contains computer implemented programming that compiles the in-focus data from along the z-axis of the reference mirror and the out-of-focus data from along the z-axis of the reference mirror to provide a reference stack of reference mirror images, and convolves the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

9. A microscope comprising a light detection and analysis system, the system comprising a light detector disposed downstream from a sample substantially in a conjugate image plane of the sample, wherein the detector is movably connected to the sample along a z-axis of the sample such that movement of the detector relative to the sample permits the detector to detect and measure in-focus data from a focal plane of the sample along the z-axis and out-of-focus data from above and below the focal plane along the z-axis, the system further comprising a controller operably connected to the detector and containing computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis.

10. The microscope of claim 9 wherein the detector further comprises a central detection pixel positioned to detect and measure in-focus light emanating from a discrete illumination pixel of the sample to provide in-focus data and at least one adjacent detection pixel in an x-y plane relative to the sample and positioned to independently detect and measure out-of-focus light emanating from the discrete illumination pixel of the sample in the x-y plane to provide out-of-focus data in the x-y plane, and wherein the controller contains computer implemented programming that compiles and combines the in-focus data and the out-of-focus data to enhance resolution of the discrete illumination pixel of the sample when compared to a resolution obtained without using the out-of-focus data.

11. The microscope of claim 10 wherein the controller fits the out-of-focus data in the x-y plane according to a 2D Gaussian distribution.

12. The microscope of claim 9 wherein the microscope further comprises a spatial light modulator disposed upstream of the sample in a conjugate image plane of the sample and the controller contains computer implemented programming that causes the spatial light modulator to simultaneously form a plurality of the illumination spots that illuminate a plurality of discrete illumination pixels of the sample and to provide sequential complementary patterns of the spots.

13. The microscope of claim 9 wherein the microscope further comprises a spatial light modulator disposed upstream of the sample in a conjugate image plane of the sample and the controller contains computer implemented programming that causes the spatial light modulator to selectively alternate between brightfield microscopy and confocal microscopy.

14. The microscope of claim 9 wherein the microscope further comprises a reference mirror disposed substantially in a conjugate image plane of the sample, the reference mirror movably connected to the detector along a z-axis of the mirror such that movement of the reference mirror relative to the detector permits the detector to detect and measure in-focus data from a focal plane of the reference mirror along the z-axis and out-of-focus data from above and below the focal plane along the z-axis, and wherein the controller contains computer implemented programming that compiles the in-focus data from along the z-axis of the reference mirror and the out-of-focus data from along the z-axis of the reference mirror to provide a reference stack of reference mirror images, and convolves the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

15. The microscope of claim 9 wherein the microscope is a reflectance microscope.

16. The microscope of claim 9 wherein the microscope is a fluorescence microscope.

17. A system for a confocal microscope, the system comprising a controller operably connected to a digital light detector disposed downstream from a sample substantially in a conjugate image plane of a sample, the detector comprising a central detection pixel positioned to detect and measure in-focus light emanating from a discrete illumination pixel of the sample to provide in-focus data and at least one adjacent detection pixel in an x-y plane relative to the sample and positioned to independently detect and measure out-of-focus light emanating from the discrete illumination pixel of the sample in the x-y plane to provide out-of-focus data in the x-y plane, wherein the controller further contains computer implemented programming that compares the in-focus data and the out-of-focus data to enhance resolution of the discrete illumination pixel of the sample when compared to a resolution obtained without using the out-of-focus data, wherein the detector of the microscope is movably connected to the sample along a z-axis of the sample such that movement of the detector relative to the sample permits the detector to detect and measure in-focus data from a focal plane of the sample along the z-axis and out-of-focus data from above and below the focal plane along the z-axis, wherein the controller further contains computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis.

18. The system of claim 17 wherein the controller fits the out-of-focus data in the x-y plane according to a 2D Gaussian distribution.

19. A controller suitable for operable connection to a microscope comprising a light detector disposed downstream from a sample substantially in a conjugate image plane of a sample and movably connected to the sample along a z-axis of the sample such that movement of the detector relative to the sample permits the detector to detect and measure in-focus data from a focal plane of the sample along the z-axis and out-of-focus data from above and below the focal plane along the z-axis, wherein the controller contains computer implemented programming that compiles and combines the in-focus data from along the z-axis and the out-of-focus data from along the z-axis to enhance resolution of the discrete illumination pixel of the sample when compared to a resolution obtained without using the out-of-focus data from along the z-axis.

20. The controller of claim 19 wherein the detector is also movably connected along a z-axis to a reference mirror disposed substantially in a conjugate image plane of the sample such that movement of the reference mirror relative to the detector permits the detector to detect and measure in-focus data from a focal plane of the reference mirror along the z-axis and out-of-focus data from above and below the focal plane along the z-axis, wherein the controller further contains computer implemented programming that compiles the in-focus data from along the z-axis of the reference mirror and the out-of-focus data from along the z-axis of the reference mirror to provide a reference stack of reference mirror images, and convolves the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

21. A confocal microscope comprising
means for detecting and measuring out-of-focus light emanating from a discrete illumination pixel of a sample in at least one of an x-y plane and a z-axis to provide a measurement of out-of-focus light, wherein the means for detecting is movably connected to the sample along a z-axis of the sample such that movement of the detector relative to the sample permits the detector to detect and measure in-focus data from a focal plane of the sample along the z-axis and out-of-focus data from above and below the focal plane along the z-axis, and
means for combining the measurement of the out-of-focus light with a measurement of in-focus light emanating from the discrete illumination pixel of the sample, to provide an enhanced resolution of the discrete illumination pixel of the sample when compared to a resolution obtained without using the out-of-focus data.

22. The microscope of claim 21 wherein the means for detecting detects and measures out-of-focus light from both the x-y plane and the z-axis, and the means for combining combines the measurement of light from both the x-y plane and the z-axis.

23. The microscope of claim 22 wherein the microscope further comprises
means for providing a reference stack of reference images along the z-axis, and
means for convolving the reference stack with the measurements of in-focus data and out-of-focus data from the z-axis of the sample, to thereby determine the location of the focal plane of the sample and thus enhance resolution of the discrete illumination pixel of the sample when compared to a resolution obtained without using the out-of-focus data from along the z-axis.

* * * * *